United States Patent
Hsieh

(10) Patent No.: US 6,895,119 B2
(45) Date of Patent: May 17, 2005

(54) METHOD AND APPARATUS FOR DECODING COMPRESSED IMAGE DATA AND CAPABLE OF PREVENTING ERROR PROPAGATION

(75) Inventor: Tsung-Hsien Hsieh, Kaohsiung Hsien (TW)

(73) Assignee: Winbond Electronics Corp., Hsinchu (TW)

( * ) Notice: Subject to any disclaimer, the term of this patent is extended or adjusted under 35 U.S.C. 154(b) by 605 days.

(21) Appl. No.: 10/102,481

(22) Filed: Mar. 14, 2002

(65) Prior Publication Data

US 2003/0174895 A1 Sep. 18, 2003

(51) Int. Cl.⁷ .............................. G06K 9/36; G06K 9/46
(52) U.S. Cl. ....................................... 382/233; 382/245
(58) Field of Search .................................. 382/218, 232, 382/233, 245; 341/59, 63, 81, 94, 102, 103; 358/426.09, 426.12, 426.13; 375/240.25, 240.27

(56) References Cited

U.S. PATENT DOCUMENTS

| | | | | |
|---|---|---|---|---|
| 3,927,251 A | * | 12/1975 | White et al. | 358/426.09 |
| 4,334,246 A | * | 6/1982 | Saran | 358/426.12 |
| 4,543,612 A | * | 9/1985 | Matsunaga et al. | 358/426.13 |
| 5,565,991 A | * | 10/1996 | Enari | 382/245 |
| 5,583,500 A | * | 12/1996 | Allen et al. | 341/107 |
| 5,592,297 A | * | 1/1997 | Van Dorsselaer | 382/245 |
| 6,205,251 B1 | * | 3/2001 | Hsieh et al. | 382/233 |
| 6,510,248 B1 | * | 1/2003 | Hsieh | 382/233 |

* cited by examiner

Primary Examiner—Andrew W. Johns
Assistant Examiner—Amir Alavi
(74) Attorney, Agent, or Firm—Christensen O'Connor; Johnson Kindness PLLC

(57) ABSTRACT

In a method and apparatus for decoding an image data block having multiple data lines compressed into codeword streams, when one of multiple different code types and a line-end code, which are defined by a run-length encoding algorithm, is detected in an N-bit part of an M-bit segment of the codeword streams, the detected one of the code types and the line-end code is interpreted to generate a decompressed output. The N-bit part is further analyzed to find a succeeding one of the code types and the line-end code therein. When an error is detected in the N-bit part, a miss code is outputted to stop interpretation and further generation of the decompressed output. Analysis of the N-bit part is continued until the line-end code is detected. The line-end code is then interpreted so as to complete decompression of one of the data lines.

18 Claims, 3 Drawing Sheets

| TABLE 1 | |
|---|---|
| d0　　　　d1 | d2　　d3 |
| NUMBER OF CONTINUOUS PIXELS WITH THE SAME PIXEL DATA | PIXEL DATA |

FIG. 1 PRIOR ART

| TABLE 2 | | |
|---|---|---|
| d0　d1 | d2　d3　d4　d5 | d6　d7 |
| 0　0 | NUMBER OF CONTINUOUS PIXELS WITH THE SAME PIXEL DATA | PIXEL DATA |

FIG. 2 PRIOR ART

| TABLE 3 | | | |
|---|---|---|---|
| d0　d1　d2　d3 | d4　d5　d6　d7　d8　d9 | d8　d9 |
| 0　0　0　0 | NUMBER OF CONTINUOUS PIXELS WITH THE SAME PIXEL DATA | PIXEL DATA |

FIG. 3 PRIOR ART

| TABLE 4 | | | | | | | | | | | | | | |
|---|---|---|---|---|---|---|---|---|---|---|---|---|---|---|
| d0 | d1 | d2 | d3 | d4 | d5 | d6 | d7 | d8 | d9 | d10 | d11 | d12 | d13 | d14 d15 |
| 0 | 0 | 0 | 0 | 0 | 0 | NUMBER OF CONTINUOUS PIXELS WITH THE SAME PIXEL DATA | | | | | | | | PIXEL DATA |

| TABLE 5 | | | | | | | | | | | | | | |
|---|---|---|---|---|---|---|---|---|---|---|---|---|---|---|
| d0 | d1 | d2 | d3 | d4 | d5 | d6 | d7 | d8 | d9 | d10 | d11 | d12 | d13 | d14 d15 |
| 0 | 0 | 0 | 0 | 0 | 0 | 0 | 0 | 0 | 0 | 0 | 0 | 0 | 0 | PIXEL DATA |

METHOD AND APPARATUS FOR DECODING COMPRESSED IMAGE DATA AND CAPABLE OF PREVENTING ERROR PROPAGATION

BACKGROUND OF THE INVENTION

1. Field of the Invention

The invention relates to a method and apparatus for decoding compressed image data, more particularly to a method and apparatus for decoding compressed image data and capable of preventing error propagation.

2. Description of the Related Art

Multimedia has become a widely used data format in computer and communication systems. However, multimedia data is very large in general so as to result in a heavy burden for storage and transmission. In order to reduce the memory space for storage and the channel bandwidth for transmission, data compression is necessary.

In a conventional compression algorithm, such as a run-length encoding algorithm, different code types and a line-end code are defined according to the following rules:

1. 1 to 3 continuous pixels with the same pixel data can be encoded into a code type 0 that has a 4-bit code length, as shown in Table 1 of FIG. 1.
2. 4 to 15 continuous pixels with the same pixel data can be encoded into a code type 1 that has an 8-bit code length, as shown in Table 2 of FIG. 2.
3. 16 to 63 continuous pixels with the same pixel data can be encoded into a code type 2 that has a 12-bit code length, as shown in Table 3 of FIG. 3.
4. 64 to 255 continuous pixels with the same pixel data can be encoded into a code type 3 that has a 16-bit code length, as shown in Table 4 of FIG. 4.
5. Continuous pixels with the same pixel data present at the end of a pixel line can be encoded into a line-end code that has a 16-bit code length, as shown in Table 5 of FIG. 5.
6. After a data line compressed in accordance with the above rules has been completed, a 4-bit dummy code, such as "0000" or "1111", may be inserted for byte alignment.

In the above-described run-length encoding algorithm, a data line must have byte alignment, i.e., the data line has a code length that is a multiple of 8 bites. When a data line compressed according to the rules 1 to 5 includes x code type 0 (4-bit code length, x is an integer not less than zero), y code type 1 (8-bit code length, y is an integer not less than zero), z code type 2 (12-bit code length, z is an integer not less than zero), u code type 3 (16-bit code length, u is an integer not less than zero) and a line-end code (16-bit code length), the data line has a code length equal to 4x+8y+12z+16u+16=4*(x+2y+3z+4u+4) bits, and rule 6 can be applied to ensure that the code length of the data line is a multiple of 8 bits.

According to the above rules, for example, if there are 2 continuous pixels with the same pixel data of "01" (0101), the pixels (0101) can be encoded into "1001" according to the code type 0 shown in FIG. 1. If there are 6 continuous pixels with the same pixel data of "01", the pixels can be encoded into "00011001" according to the code type 1 shown in FIG. 2. If there are 63 continuous pixels with the same pixel data of "01", the pixels of 126 bits can be encoded into "000011111101" (12 bits) according to the code type 2 shown in FIG. 3. If there are 255 continuous pixels with the same pixel data of "01", the pixels of 510 bits can be encoded into "0000001111111101"(16 bits) according to the code type 3 shown in FIG. 4. If there are a plurality of continuous pixels from a current pixel to the end of a pixel line with the same pixel data of "01", the pixels can be encoded into "0000000000000001" (16 bits) according to the line-end code shown in FIG. 5.

In summary, the aforesaid run-length encoding algorithm has the following properties:

1. Each of the code types has a specific code length.
2. Since a line-end code is present at the end of each data line, the compression algorithm is line-based.
3. During the compression process, a proper code type can be used to represent a specific pixel combination. Accordingly, during the decompression process, an input codeword must be one of the code types and the line-end code when the input codeword is not corrupted.

FIG. 6 illustrates a conventional run-length decoder 1 for decoding an image data block that has a plurality of data lines compressed into code word streams in accordance with the above-described run-length encoding algorithm. The conventional run-length decoder 1 includes a shifter 11, a codeword comparator 12, a code interpreter 13, and a shifter controller 14.

The shifter 11 has a codeword input for receiving a 32-bit segment of the codeword streams, and a codeword output 112 for outputting a 16-bit part of the 32-bit segment received thereby.

The codeword comparator 12 is connected to the codeword output 112 and is operable so as to orderly and continuously analyze the 16-bit part to verify presence of one of the code types (code type 0, code type 1, code type 2 and code type 3) and the line-end code therein. The codeword comparator 12 outputs one of the code types and the line-end code upon detecting the presence of said one of the code types and the line-end in the 16-bit part.

The code interpreter 13 is connected to the codeword comparator 12 and is operable so as to interpret said one of the code types and the line-end code from the codeword comparator 12 in accordance with the run-length encoding algorithm to generate a decompressed output.

The shifter controller 14 is connected to the shifter 11 and the codeword comparator 12. The shifter controller 14 controls the shifter 11 to update the 16-bit part by discarding the detected one of the code types and the line-end code and by appending a succeeding P-bit part of the 32-bit segment to remainder of the 16-bit part. The P-bit part has a code length equal to that of the detected one of the code types and the line-end code. The shifter 11 generates a request for updating the 32-bit segment when an analyzed length thereof is equal to 16. As such, when the codeword comparator 12 outputs a code type 0, the 16-bit part is updated by discarding the code type 0 therefrom and by appending a succeeding 4-bit part of the 32-bit segment to the remainder of the 16-bit part. When the codeword comparator 12 outputs a code type 1, the 16-bit part is updated by discarding the code type 1 therefrom and by appending a succeeding 8-bit part of the 32-bit segment to the remainder of the 16-bit part. When the codeword comparator 12 outputs a code type 2, the 16-bit part is updated by discarding the code type 2 therefrom and by appending a succeeding 12-bit part of the 32-bit segment to the remainder of the 16-bit part. When the codeword comparator 12 outputs a code type 3, the shifter 11 generates a request for updating the 32-bit segment by discarding the analyzed first 16 bits therefrom and by appending 16 bits of the codeword streams to the second 16 bits of the 32-bit segment, and the 16-bit part is updated with a corresponding part of the updated 32-bit segment.

In the following example, the conventional run-length decoder 1 is used for decoding a 100-pixel image data line compressed into a codeword stream. The codeword stream is "1100-00011101-000001000010-0000 000100000011-0000000000000010".

The decompression process of the data line is as follows:

1. Initially, the first 32 bits ("1100-00011101-000001000010-00000001") of the codeword stream are received by the shifter 11 and serves as the 32-bit segment. The shifter 11 outputs the first 16 bits ("1100-00011101-0000") of the 32-bit segment that serves as the 16-bit part to the codeword comparator 12. The codeword comparator 12 verifies the presence of a code type 0 ("1100") in the 16-bit part, and outputs the code type 0 ("1100"). The code interpreter 13 interprets the code type 0 from the codeword comparator 12 in accordance with the above-described run-length encoding algorithm so as to generate a decompressed output corresponding to the code type 0 ("1100") that has 3 continuous pixels (i.e., pixel length=3) with the same pixel data of "00". The shifter controller 14 controls the shifter 11 to update the 16-bit part ("1100-00011101-0000") by discarding the code type 0 ("1100") from the 16-bit part ("1100-00011101-0000") and by appending a succeeding 4-bit part ("0100") of the 32-bit segment to the remainder of the 16-bit part ("00011101-0000") such that the 16-bit part becomes "00011101-00000100".

2. Subsequently, the codeword comparator 12 continuous analysis of the 16-bit part ("00011101-0000 0100"), verifies presence of a code type 1 ("00011101") in the 16-bit part, and outputs the code type 1 ("00011101"). The code interpreter 13 interprets the code type 1 from the codeword comparator 12 in accordance with the above-described run-length encoding algorithm so as to generate a decompressed output corresponding to the code type 1 ("00011101") that has 7 continuous pixels (i.e., pixel length=7) with the same pixel data of "01". The shifter controller 14 controls the shifter 11 to update the 16-bit part ("00011101-00000100") by discarding the code type 1 ("00011101") from the 16-bit part ("00011101-00000100") and by appending a succeeding 8-bit part ("00100000") of the 32-bit segment to the remainder of the 16-bit part ("00000100") such that the 16-bit part becomes "000001000010-0000".

3. Then, the codeword comparator 12 continuous analysis of the 16-bit part ("000001000010-0000") verifies presence of a code type 2 ("000001000010") in the 16-bit part, and outputs the code type 2 ("000001000010"). The code interpreter 13 interprets the code type 2 from the codeword comparator 12 in accordance with the above-described run-length encoding algorithm so as to generate a decompressed output corresponding to the code type 2 ("000001000010") that has 16 continuous pixels (i.e., pixel length=16) with the same pixel data of "10". Since the analyzed length of the current 32-bit segment is equal to 24 (4+8+12), the shifter 11 generates a request for updating the 32-bit segment by discarding the first 16 bits ("1100-00011101-0000") from the 32-bit segment and by appending a succeeding 16 bits ("00000011-00000000") of the codeword stream to the remainder of the 32-bit segment ("01000010-00000001") such that the 32-bit segment becomes "01000010-0000 000100000011-00000000". The shifter controller 14 controls the shifter 11 to update the 16-bit part ("000001000010-0000") by discarding the code type 2 ("000001000010") from the 16-bit part ("000001000010-0000") and by appending a succeeding 12-bit part ("000100000011") of the 32-bit segment to the remainder of the 16-bit part ("0000") such that the 16-bit part becomes "0000000100000011".

4. Thereafter, the codeword comparator 12 continuous analysis of the 16-bit part ("10000000100000011"), verifies presence of a code type 3 ("0000000100000011") in the 16-bit part, and outputs the code type 3 ("0000000100000011"). The code interpreter 13 interprets the code type 3 from the codeword comparator 12 in accordance with the above-described run-length encoding algorithm so as to generate a decompressed output corresponding to the code type 3 ("0000000100000011") that has 64 continuous pixels (i.e., pixel length=64) with the same pixel data of "11". Since the analyzed length of the current 32-bit segment is equal to 16, the shifter 11 once again generates a request for updating the 32-bit segment according to the previously described manner such that the 32-bit segment becomes "00000011-0000000000000010-xxxxxxxx" ("x" means do not care). The shifter controller 14 controls the shifter 11 to update the 16-bit part ("0000000100000011") by discarding the code type 3 ("0000000100000011") from the 16-bit part such that the 16-bit part becomes "0000000000000010".

5. Eventually, the codeword comparator 12 verifies the presence of a line-end code ("0000000000000010") in the 16-bit part, and outputs the line-end code ("0000000000000010"). The code interpreter 13 interprets the line-end code from the codeword comparator 12 in accordance with the above-described run-length algorithm so as to generate a decompressed output corresponding to the line-end code ("0000000000000010") that has 10 (equal to 100−3−7−16−64) continuous pixels with the same pixel data of "10". As such, decompression of the data line is thus completed.

Due to the presence of noise during transmission or storage, the compressed codeword stream may be corrupted such that the codeword comparator 12 is unable to verify the presence of a correct one of the code types and the decoder 1 thus fails to output a correct decompressed output. It is noted that when the compressed data is corrupted, the conventional run-length decoder 1 cannot continuously decode the compressed data. Furthermore, when the codeword comparator 12 is unable to verify the presence of the correct one of the code types, the shifter controller 14 will be unable to properly control the shifter 11 to update the 16-bit part, thereby resulting in an adverse affect on a succeeding decompressed output, which arises in error propagation.

SUMMARY OF THE INVENTION

Therefore, the object of the present invention is to provide a method and apparatus for decoding compressed image data and capable of preventing error propagation.

According to one aspect of the present invention, a method is adapted for decoding an image data block that has a plurality of data lines compressed into codeword streams in accordance with a run-length encoding algorithm. The run-length encoding algorithm defines a plurality of different code types and a line-end code, each of which has a specific code length. Each of the code types contains a reference to number of continuous and repetitive pixel data. The method comprises the steps of:

(a) receiving an M-bit segment of the codeword streams;

(b) outputting an N-bit part of the received M-bit segment;

(c) orderly analyzing the N-bit part to verify presence of one of the code types and the line-end code therein;

(d) upon detecting the presence of one of the code types and the line-end code in the N-bit part, outputting said one of the code types and the line-end code, interpreting said one of the code types and the line-end code in accordance with the run-length encoding algorithm to generate a decompressed output, and continuing with analysis of the N-bit part to find a succeeding one of the code types and the line-end code therein; and (e) upon detecting the presence of an error in the N-bit part, outputting a miss code to stop interpretation and further generation of the decompressed output, continuing with analysis of the N-bit part until the line-end code is detected, outputting the line-end code when the line-end code is eventually detected, and interpreting the line-end code in accordance with the run-length encoding algorithm so as to complete decompression of at least one of the data lines.

According to another aspect of the present invention, an apparatus is adapted for decoding an image data block that has a plurality of data lines compressed into codeword streams in accordance with a run-length encoding algorithm. The run-length encoding algorithm defines a plurality of different code types and a line-end code, each of which has a specific code length. Each of the code types contains a reference to number of continuous and repetitive pixel data. The apparatus comprises:

a shifter having a codeword input for receiving an M-bit segment of the codeword streams, and a codeword output for outputting an N-bit part of the M-bit segment received thereby;

a codeword comparator connected to the codeword output and operable so as to orderly and continuously analyze the N-bit part to verify presence of one of the code types and the line-end code therein, the codeword comparator outputting one of the code types and the line-end code upon detecting the presence of said one of the code types and the line-end code in the N-bit part, the codeword comparator subsequently outputting a miss code upon detecting presence of an error in the N-bit part, the output of said codeword comparator changing from the miss code to the line-end code when the presence of the line-end code is eventually detected thereby; and a code interpreter connected to the codeword comparator and operable so as to interpret said one of the code types and the line-end code from the codeword comparator in accordance with the run-length encoding algorithm to generate a decompressed output, and so as to stop interpretation and further generation of the decompressed output upon receipt of the miss code from the codeword comparator.

BRIEF DESCRIPTION OF THE DRAWINGS

Other features and advantages of the present invention will become apparent in the following detailed description of the preferred embodiment with reference to the accompanying drawings, of which:

FIG. 1 is a table illustrating a code type 0 defined by a run-length encoding algorithm;

FIG. 2 is a table illustrating a code type 1 defined by the run-length encoding algorithm;

FIG. 3 is a table illustrating a code type 2 defined by the run-length encoding algorithm;

DETAILED DESCRIPTION OF THE PREFERRED EMBODIMENT

Figure 7:
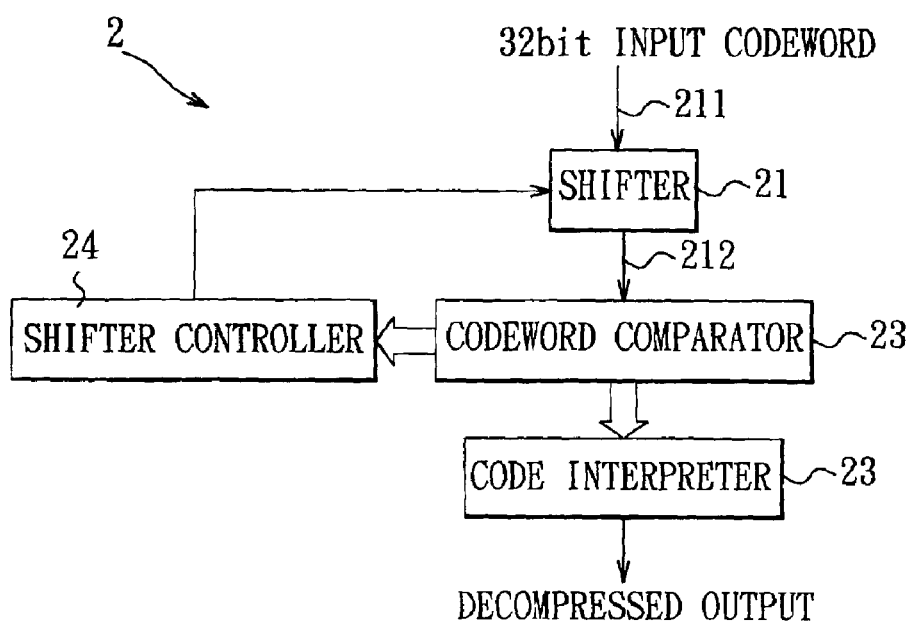
FIG. 7 is a schematic circuit block diagram illustrating the preferred embodiment of an apparatus for decoding compressed image data according to the present invention.

Referring to FIG. 7, according to the preferred embodiment of the present invention, an apparatus 2 is adapted for decoding an image data block (not shown) that has a plurality of data lines compressed into codeword streams in accordance with the previously described run-length encoding algorithm, and is shown to include a shifter 21, a codeword comparator 22, a code interpreter 23, and a shifter controller 24.

The shifter 21 has a codeword input 211 for receiving a 32-bit segment of the codeword streams, and a codeword output 212 for outputting a 16-bit part of the 32-bit segment received thereby.

Figures 4, 5, 6:
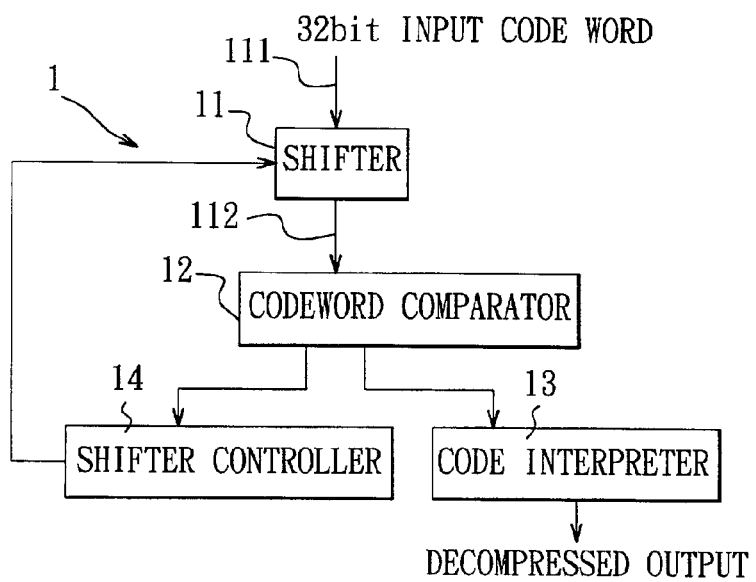
FIG. 4 is a table illustrating a code type 3 defined by the run-length encoding algorithm.
FIG. 5 is a table illustrating a line-end code defined by the run-length encoding algorithm.
FIG. 6 is a schematic circuit block diagram illustrating a conventional run-length decoder.

The codeword comparator 22 is connected to the codeword output 212 and is operable so as to orderly and continuously analyze the 16-bit part to verify presence of one of different code types and a line-end code therein. The codeword comparator 22 outputs one of the code types and the line-end code upon detecting the presence of said one of the code types and the line-end code in the 32-bit part. In this embodiment, the code types include the code type 0 with a 4-bit code length (as shown in Table 1 of FIG. 1), the code type 1 with a 8-bit code length (as shown in Table 2 of FIG. 2), the code type 2 with a 12-bit code length (as shown in Table 3 of FIG. 3) and the code type 3 with a 16-bit code length (as shown in Table 4 of FIG. 4). The line-end code has a 16-bit code length (as shown in Table 5 of FIG. 5). The definitions of the different code types and the line-end code are the same as those described beforehand. The codeword comparator 22 subsequently outputs a miss code upon detecting the presence of an error in the 16-bit part. The error is detected when, due to the corruption of the 16-bit part, the codeword comparator 22 cannot verify the presence of any one of the code types and the line-end code in the 16-bit part. The output of the codeword comparator 22 changes from the miss code to the line-end code when the presence of the line-end code is eventually detected thereby.

The code interpreter 23 is connected to the codeword comparator 22 and is operable so as to interpret said one of the code types and the line-end code from the codeword comparator 22 in accordance with the run-length encoding algorithm to generate a decompressed output, and so as to stop interpretation and further generation of the decompressed output upon receipt of the miss code from the codeword comparator 22.

The shifter controller 24 is connected to the shifter 21 and the codeword comparator 22. The shifter controller 24 controls the shifter 21 to update the 16-bit part by discarding the detected one of the code types and the line-end code from the 16-bit part and by appending a succeeding P-bit part of the 32-bit segment to the remainder of the 16-bit part. The P-bit part has a code length equal to that of the detected one of the code types and the line-end code. In this embodiment, the shifter controller 24 further controls the shifter 21 to up date the 16-bit part when the codeword comparator 22 generates the miss code by discarding a predetermined code length of the 16-bit part and by appending a succeeding Q-bit part of the 32-bit segment to the remainder of the 16-bit part. The Q-bit part has a code length equal to that of the predetermined code length. The predetermined code length is a common factor of the code lengths of the code types and the line-end code. In this embodiment, to achieve an increased decoding speed, the predetermined code length is a highest common factor of the code lengths of the code types and the line-end code, i.e., the predetermined code length is 4.

When an analyzed length of the 32-bit segment is equal to 16, the shifter 11 generates a request for updating the 32-bit segment by discarding the analyzed first 16bits therefrom and by appending 16 bits of the codeword streams to the second 16 bits of the 32-bit segment. The 16-bit part is then updated with a corresponding part of the updated 32-bit segment.

The following example is proposed to illustrate how the apparatus 2 of the present invention decompresses a 100-pixel image data line compressed into a codeword stream that is identical to that described beforehand. The original codeword stream is "1100-00011101-000001000010-0000000100000011-000000 0000000010". Due to the presence of noise during transmission or storage, the original codeword stream is corrupted and becomes "1100-00011101-000001000010-0000000000010011-000000 0000000010" (the underlined portions are corrupted). The following describes the decompression procedure of the apparatus 2 of the present invention:

1. Since a part (from the first bit to the 24$_{th}$ bit) of the corrupted codeword stream is not corrupted, the decompressed result is the same as that obtained in the aforesaid decoder of the prior art, and a detailed description will be omitted herein for the sake of brevity. As such, the code interpreter 23 orderly and continuously generates a first decompressed output (pixel length=3, pixel data="00"), a second decompressed output (pixel length=7, pixel data="01"), and a third decompressed output (pixel length=16, pixel data ="10").

2. Subsequently, with the 32-bit segment being "01000010-0000000000010011-00000000", the codeword comparator 22 continuous analysis of the 16-bit part ("0000000000010011"), and detects the presence of an error in the 16-bit part. The error is detected due to the presence of 11 zeros that do not conform with the definition of any of the code types and line-end code. The codeword comparator 22 subsequently outputs a miss code. When the code interpreter 23 receives the miss code from the codeword comparator 22, the code interpreter 23 stops interpretation and further generation of the decompressed output. The shifter controller 24 controls the shifter 21 to update the 16-bit part when the shifter controller 24 receives the miss code from the codeword comparator 22 by discarding the first 4 bits ("0000") of the 16-bit part ("0000000000010011") and by appending a succeeding 4-bit part ("0000") of the 32-bit segment to the remainder of the 16-bit part ("000000010011") such that the 16-bit part becomes "000000010011-0000".

3. Then, because the codeword comparator 22 has yet to detect the presence of the line-end code, the codeword comparator 22 continuous to output the miss code. Since an analyzed length of the 32-bit segment is 16 (equal to 8+4+4), the shifter 21 generates a request for updating the current 32-bit segment by discarding the first 16 bits ("01000010-00000000") from the 32-bit segment and by appending a succeeding 16 bits ("00000010-xxxxxxxx") of the codeword stream to the remainder of the 32-bit segment ("00010011-00000000") such that the 32-bit segment becomes "00010011-0000000000000010-xxxxxxxx" ("x" means do not care). The shifter controller 24 controls the shifter 21 to update the 16-bit part when the shifter controller 24 receives the miss code from the codeword comparator 22 such that the 16-bit part becomes "00010011-00000000".

4. Thereafter, the codeword comparator 22 still has yet to detect the presence of the line-end code and continuous to output the miss code. The shifter controller 24 controls the shifter 21 to update the 16-bit part when the shifter controller 24 receives the miss code from the codeword comparator 22 by discarding the first 4 bits ("0001") of the 16-bit part ("00010011-00000000") and by appending a succeeding 4-bit part ("0000") of the 32-bit segment to the remainder of the 16-bit part ("0011-00000000") such that the 16-bit part becomes "0011-000000000000".

5. Thereafter, the codeword comparator 22 still has yet to detect the presence of the line-end code and continuous to output the miss code. The shifter controller 24 controls the shifter 21 to update the 16-bit part when the shifter controller 24 receives the miss code from the codeword comparator 22 by discarding the first 4 bits ("0011") of the 16-bit part ("0011-000000000000") and by appending a succeeding 4-bit part ("0010") of the 32-bit segment to the remainder of the 16-bit part ("00000000000") such that the 16-bit part becomes "0000000000000010".

6. Eventually, the codeword comparator 22 verifies the presence of a line-end code ("0000000000000010") in the 16-bit part, and outputs the line-end code ("0000000000000010") accordingly. The code interpreter 23 interprets the line-end code from the codeword comparator 22 in accordance with the above-described run-length algorithm so as to generate a decompressed output corresponding to the line-end code ("0000000000000010") that has 74 (equal to 100−3−7−16) continuous pixels with the same pixel data of "10". As such, the decompression of a data line of the codeword stream is completed.

Since the codeword comparator 22 of this invention is designed to output a miss code when the 16-bit part contains a corrupted one of the code types and the line-end code, the code interpreter 23 can stop interpretation and further generation of the decompressed output, and the shifter controller 24 can control the shifter 21 to update the 16-bit part until the line-end code is detected. As such, even though a data line of the codeword streams is corrupted due to the presence of noise, the apparatus 2 of this invention can still decode a succeeding data line of the codeword streams, and the error can be limited to the corrupted data line such that error propagation is thus prevented.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

List of Partners of Christensen O'Connor Johnson & Kindness$^{PLLC}$

Bruce E. O'Connor, Reg. No. 24,849;
Lee E. Johnson, Reg. No. 22,946;
Gary S. Kindness, Reg. No. 22,178;
James W. Anable, Reg. No. 26,827;
James R. Uhlir, Reg. No. 25,096;
Jerald E. Nagae, Reg. No. 29,418;
Dennis K. Shelton, Reg. No. 26,997;
Jeffrey M. Sakoi, Reg. No. 32,059;
Ward Brown, Reg. No. 28,400;
Robert J. Carlson, Reg. No. 35,472;
Rodney C. Tullett, Reg. No. 34,034;
Daiva K. Tautvydas, Reg. No. 36,077;
Mary L. Culic, Reg. No. 40,574;
Julie C. VanDerZanden, Reg. No. 38,105;
George E. Renzoni, Reg. No. 37,919;
Philip P. Mann, Reg. 30,960;
George S. Farber, Reg. No. 41,497;
Kevan L. Morgan, Reg. No. 42015; and
John D. Denkenberger, Reg. No. 44,060.

I claim:

1. A method for decoding an image data block that has a plurality of data lines compressed into codeword streams in accordance with a run-length encoding algorithm, the run-length encoding algorithm defining a plurality of different code types and a line-end code, each of which has a specific code length, each of the code types containing a reference to number of continuous and repetitive pixel data, the method comprising the steps of:

(a) receiving an M-bit segment of the codeword streams;

(b) outputting an N-bit part of the received M-bit segment;

(c) orderly analyzing the N-bit part to verify presence of one of the code types and the line-end code therein;

(d) upon detecting the presence of one of the code types and the line-end code in the N-bit part, outputting said one of the code types and the line-end code, interpreting said one of the code types and the line-end code in accordance with the run-length encoding algorithm to generate a decompressed output, and continuing with analysis of the N-bit part to find a succeeding one of the code types and the line-end code therein; and (e) upon detecting the presence of an error in the N-bit part, out putting a miss code to stop interpretation and further generation of the decompressed output, continuing with analysis of the N-bit part until the line-end code is detected, outputting the line-end code when the line-end code is eventually detected, and interpreting the line-end code in accordance with the run-length encoding algorithm so as to complete decompression of at least one of the data lines.

2. The method as claimed in claim 1, wherein, in step (d), prior to continuing with analysis of the N-bit part, the N-bit part is updated by discarding the detected one of the code types and the line-end code and by appending a succeeding P-bit part of the M-bit segment to remainder of the N-bit part, the P-bit part having a code length equal to that of the detected one of the code types and the line-end code.

3. The method as claimed in claim 1, wherein, in step (e), prior to continuing with analysis of the N-bit part, the N-bit part is updated by discarding a predetermined code length of the N-bit part, and by appending a succeeding Q-bit part of the M-bit segment to remainder of the N-bit part, the Q-bit part having a code length equal to that of the predetermined code length.

4. The method as claimed in claim 3, wherein the predetermined code length is a common factor of the specific code lengths of the code types and the line-end code.

5. The method as claimed in claim 4, wherein the predetermined code length is a highest common factor of the specific code lengths of the code types and the line-end code.

6. The method as claimed in claim 1, wherein the value of (N) is not less than the specific code length of any of the code types and the line-end code.

7. The method as claimed in claim 1, wherein the value of (M) is a multiple of that of (N).

8. The method as claimed in claim 1, wherein the value of (M) is twice the value of (N).

9. The method as claimed in claim 8, further comprising the step of updating the M-bit segment when an analyzed length thereof is equal to the value of (N).

10. An apparatus for decoding an image data block that has a plurality of data lines compressed into codeword streams in accordance with a run-length encoding algorithm, the run-length encoding algorithm defining a plurality of different code types and a line-end code, each of which has a specific code length, each of the code types containing a reference to number of continuous and repetitive pixel data, said apparatus comprising:

a shifter having a codeword input for receiving an M-bit segment of the codeword streams, and a codeword output for outputting an N-bit part of the M-bit segment received thereby;

a codeword comparator connected to said codeword output and operable so as to orderly and continuously analyze the N-bit part to verify presence of one of the code types and the line-end code therein, said codeword comparator outputting one of the code types and the line-end code upon detecting the presence of said one of the code types and the line-end code in the N-bit part, said codeword comparator subsequently outputting a miss code upon detecting presence of an error in the N-bit part, the output of said codeword comparator changing from the miss code to the line-end code when the presence of the line-end code is eventually detected thereby; and a code interpreter connected to said codeword comparator and operable so as to interpret said one of the code types and the line-end code from said codeword comparator in accordance with the run-length encoding algorithm to generate a decompressed output, and so as to stop interpretation and further generation of the decompressed output upon receipt of the miss code from said codeword comparator.

11. The apparatus as claimed in claim 10, further comprising a shifter controller connected to said shifter and said codeword comparator, said shifter controller controlling said shifter to update the N-bit part by discarding the detected one of the code types and the line-end code from the N-bit part and by appending a succeeding P-bit part of the M-bit segment to remainder of the N-bit part, the P-bit part having a code length equal to that of the detected one of the code types and the line-end code.

12. The apparatus as claimed in claim 11, wherein said shifter controller further controls said shifter to update the N-bit part when said codeword comparator generates the miss code by discarding a predetermined code length of the N-bit part and by appending a succeeding Q-bit part of the M-bit segment to remainder of the N-bit part, the Q-bit part having a code length equal to that of the predetermined code length.

13. The apparatus as claimed in claim 12, wherein the predetermined code length is a common factor of the specific code lengths of the code types and the line-end code.

14. The apparatus as claimed in claim 13, wherein the predetermined code length is a highest common factor of the specific code lengths of the code types and the line-end code.

15. The apparatus as claimed in claim 10, wherein the value of (N) is not less than the specific code length of any of the code types and the line-end code.

16. The apparatus as claimed in claim 10, wherein the value of (M) is a multiple of that of (N).

17. The apparatus as claimed in claim 10, wherein the value of (M) is twice the value of (N).

18. The apparatus as claimed in claim 17, wherein said shifter generates a request for updating the M-bit segment when an analyzed length thereof is equal to the value of (N).

* * * * *